United States Patent [19]

Callsen et al.

[11] Patent Number: 4,951,354
[45] Date of Patent: Aug. 28, 1990

[54] PROCESS FOR GAINING THE MEAT FROM THE BODIES OF SLAUGHTERED POULTRY AND APPARATUS FOR PERFORMING THE PROCESS

[75] Inventors: Hans Callsen, Bad Schwartau; Detlef Meyer; Peter Muuhs, both of Lübeck, all of Fed. Rep. of Germany

[73] Assignee: Nordischer Maschinenbau Rud Baader GmbH & Co. KG, Lubeck, Fed. Rep. of Germany

[21] Appl. No.: 327,050

[22] Filed: Mar. 22, 1989

[30] Foreign Application Priority Data

Apr. 2, 1988 [DE] Fed. Rep. of Germany ....... 3811317

[51] Int. Cl.$^5$ .............................................. A22C 25/16
[52] U.S. Cl. ........................................... 17/46; 17/11; 17/1 G
[58] Field of Search ......................... 17/46, 11, 1 G, 52

[56] References Cited

U.S. PATENT DOCUMENTS

| | | | |
|---|---|---|---|
| 4,557,017 | 12/1986 | Gasbarro | 17/11 |
| 4,648,155 | 3/1987 | Burnett | 17/46 |
| 4,688,297 | 8/1987 | Bartels | 17/11 |
| 4,827,570 | 5/1989 | Scheier et al. | 17/46 |

FOREIGN PATENT DOCUMENTS

A1168865 1/1986 European Pat. Off. .

Primary Examiner—Willis Little
Attorney, Agent, or Firm—Fay, Sharpe, Beall, Fagan, Minnich & McKee

[57] ABSTRACT

A process for gaining meat from the bodies of slaughtered poultry and an apparatus for performing this process are described. Importance is attached to the processing in the region of the clavicle in preparation for the same, and the problem to be solved is to ensure that even in the case of a broken clavicle, fragments thereof do not remain in the breast meat. This problem is solved by introducing a block into the V-bifurcation of the clavicle, said block having a wedge-shaped configuration in plan view and its flanks being provided with groove-like recesses, in which can be flushly engaged the branches of the clavicle, so that they disappear in these recesses. By means of peeling knives guided over the flanks of the block, the clavicle can be peeled free at its outer contour without a risk of any broken fragments being grasped and removed.

3 Claims, 2 Drawing Sheets

PROCESS FOR GAINING THE MEAT FROM THE BODIES OF SLAUGHTERED POULTRY AND APPARATUS FOR PERFORMING THE PROCESS

BACKGROUND OF THE INVENTION

1. Field of the Invention

The invention relates to a process for gaining the meat from the bodies of slaughtered poultry or parts thereof, as well as to an apparatus suitable for performing the process.

Great significance is attached to the treatment of the area around the wishbone or clavicle in gaining the meat from the bodies of slaughtered poultry, because it has, on the one hand, a significant influence on the yield obtainable and, on the other, on the need for trimming in order to obtain the desired quality. The clavicle is a fork-like tubular bone linking together the wing joints at the end of the coracoid bone. It is embedded in the breast meat, the top part of the clavicle being directed towards the crest of the breast bone or sternum, terminating upstream thereof and being fixed thereto by a sinew. Considerable problems exist particularly during the mechanical gaining of the meat in achieving the necessary detachment of the clavicle from the breast meat, which problems occur at least partly due to the fact that the clavicle is broken in a considerable number of the poultry bodies to be processed. The reasons for this lie in the preparatory operations. The clavicle can be broken or separated several times and at random points. It relatively frequently occurs that, due to the guidance of the cut when separating the wings or through the effect of force during this process, the clavicle is detached at the attachment point in the region of the wing joints or is broken in the vicinity thereof. While manual processing can adapt to these conditions, there is an inherent risk of fragments of the clavicle remaining in the fillet. However, a product of this quality cannot be accepted, particularly due to the risk of injury on the sharp fracture surfaces of said bone parts, and consequently requires trimming, which is costly from the standpoint of yield loss and time incurred.

2. Prior Art

From EP-A1-168 865, there is known a process for gaining the breast meat from poultry bodies, which is directed at solving the aforementioned problems. In this process, the head of the clavicle is removed from the skeleton before detaching the meat. For this purpose, the poultry bodies prepared as front halves are applied to a saddle moved by means of a conveyor and are initially supplied to a tool, which penetrates with a hook-like cutting punch through the leading neck opening into the clavicle while engaging over the clavicle head. The cutting punch is then drawn back out of the path of the saddle, so that the clavicle head seized by gripping engagement from behind is entrained and sheared from the two clavicle branches through introduction into a cavity. The clavicle branches remaining on the skeleton are then pushed by corresponding means into a favourable position for filleting and the breast meat is slid off.

In the case of a clavicle broken several times in the region of the wing joints, this apparatus does not make it possible to reliably prevent broken parts thereof from remaining in the fillet meat.

3. Objects of the Invention

It is therefore the main object of the present invention to propose a process which eliminates these disadvantages. It is a further object of the invention to make it possible through the use of such process to obtain the breast meat without trimming, at high yield and with optimal efficiency.

SUMMARY OF THE INVENTION

According to the invention, these objects are achieved by a process in which, prior to the separation of the meat from the skeleton, the wishbone (clavicula) is fixed positively from the inside, at least in the region of its branches, and is then peeled free at its outer contour, and the sinews attached to the end of the coracoid bones in the region of the body joints of the wings are cut through.

The advantages attainable by this process are in particular that a clavicle broken at a random point remains bound as a whole in the connective tissues and sinews, which remain on the skeleton following the detachment of the fillet or fillets.

Poultry bodies freed from their members can be processed advantageously by means of an apparatus, which comprises a driven conveyor, which is equipped with holding means for conveying the poultry bodies and supporting the same on the inside of the breast bone (sternum) and which advances the poultry bodies with the clavicle first. The apparatus is characterized in that centrally above the path of the holding means is arranged a shaped block, which is wedge-shaped in plan view, that can be moved in a controlled manner into said path and along the same. The flanks of said block describe a contour substantially corresponding to the inner contour of the clavicle and provided are with groovelike recesses for the externally flush reception of the branches of the clavicle. A stationary peeling or paring tool is arranged also above the path of the holding means, which tool comprises a pair of reciprocally spring-charged peeling or paring knives guided with their cutting edges on the flanks of the shaped block, in height-yieldable manner and movable in controlled manner out of the path of the holding means.

The processing of breast caps of poultry bodies is performed expediently in an apparatus in which the holding means comprise a clamping device, including an inner and an outer clamping element. The breast caps are held by the breastbone in the region between the connection points of the coracoid bones in a positive and/or non-positive manner. The apparatus is characterized in that the outer clamping component is designed as a shaped block.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
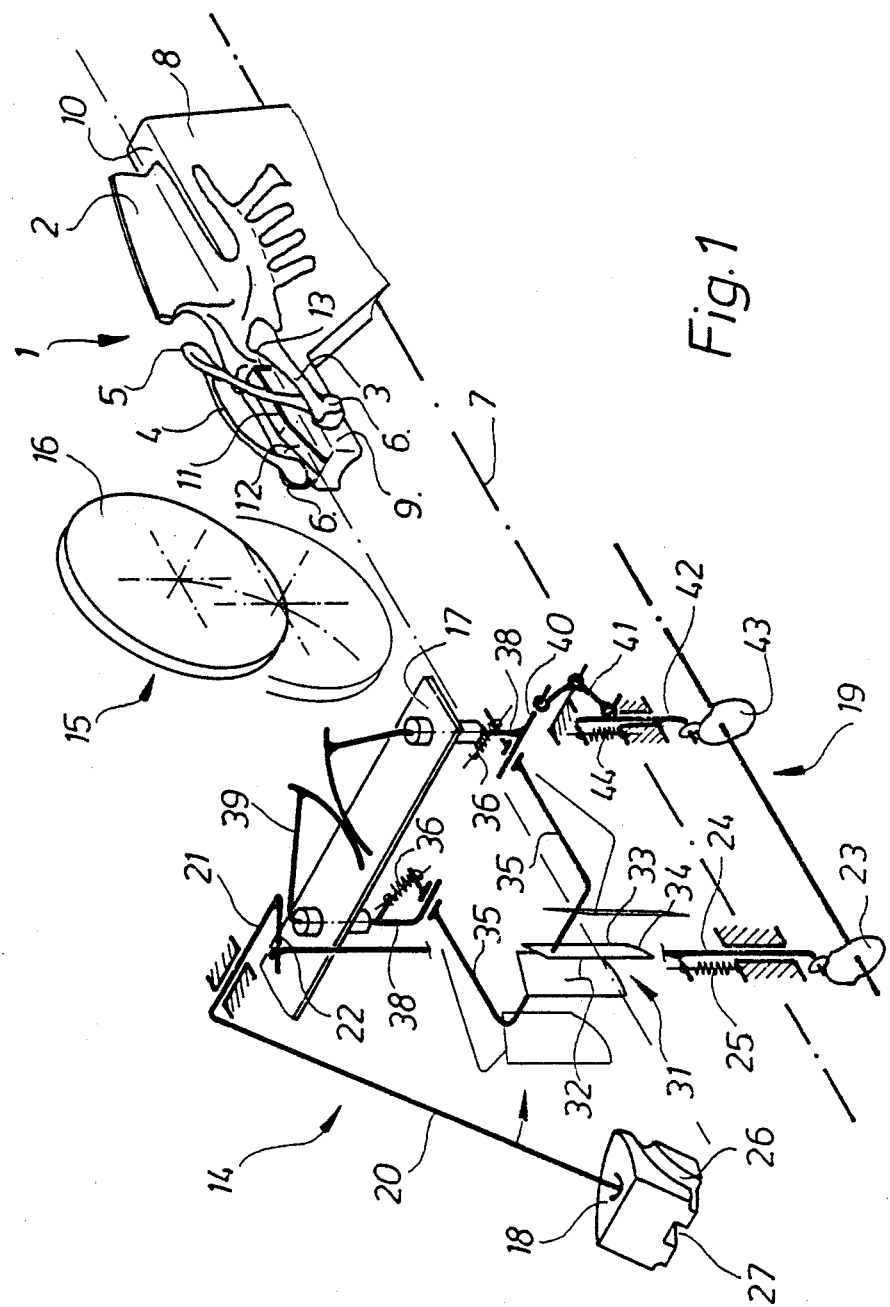
FIG. 1 shows a simplified view of the apparatus in an axonometric representation.

In a not shown frame of an apparatus for gaining the breast meat from bodies 1 of slaughtered poultry, depicted in FIG. 1 as the front halves of such bodies, is arranged an endless conveyor 7 equipped with saddles 8 mounted at even spacings for receiving the front halves to be processed. A not completely represented front half to be used for processing is formed through a diagonal cut transversely through the poultry body 1 said cut extending, accompanied by the separation of the pelvis together with the legs and by cutting through the backbone, roughly parallel to the ribs connected to the vertebral column. Each saddle 8 is equipped with a saddle horn 9, which is directed in the conveying direction and is provided with a support face 10 for supporting the front half to be processed on the inside of the breast bone (sternum) 2. A web 11 extending roughly over the length of the saddle horn 9 projects from the support face 10, the forwardly directed part of which web has a starting ramp 12, and which web terminates at the trailing end with an end face 13, which serves as a stop face for the saddled poultry body 1.

Above the conveyor path defined by the support faces 10 of saddles 8 is located the processing device 14 for the clavicle 4 which, as indicated, is essential in accordance with the invention and precedes a separating tool 15 with a pair of circular knives 16 for making incisions on either side of the crest-like web of the sternum 2. The separating tool 15 is mounted appropriately so that it can be pivoted from a position outside the path of the poultry body into the same. Swinging or pivoting-in takes place as a function of the position of the saddle 8 carrying the poultry body to be processed first, a matching of the time taking place in such a way that the incisions take place immediately after the clavicle 4 has passed by.

The processing device 14 is mounted on a framefixed bracket 17. The processing device 14 comprises not shown guide means, which hold down the poultry body 1, whilst centering it on saddle 8 and also comprises a shaped block 18 located in the region of the guides or immediately following the latter. This block is arranged centrally to the path of the saddles 8 and can be brought into positive contact with the saddles 8 by pivoting into their path. The pivoting movement of the shaped block 18 is ensured by a cam gear 19 moving synchronously with the conveyor 7. To this end, the shaped block 18 is fitted to the free end of a carrying lever 20, which with its other end is fixed to a frame-fixed pivot axle 21 arranged transversely to the path of the saddles 8. A pivot lever 22 engages on the pivot axle 21. The shaped block 18 is shown in a position roughly corresponding to the end position thereof after the passage of a poultry body 1. This position is ensured on the one hand by a cam disk 23 of the cam gear 19, which disk has pivoted the pivot axle 21 by means of a roll follower 24, held back by a spring 25 and engaging on the pivot lever 22, and on the other by the temporary entrainment of the shaped block 18 by the saddle 8.

The shaped block 18 has a wedge-shaped configuration in plan view, the wedge nose being directed against the movement direction of conveyor 7. Its flanks have a convex structure and describe a contour essentially corresponding to the inner contour of the clavicle 4. Each of the flanks of the shaped block 18 is provided with a groove-like recess 26, whose configuration, direction and cross-sectional shape are chosen in such a way that the branches of the clavicle 4 can be inserted therein, when the block 18 is pivoted into the V-bifurcation of the clavicle 4 and externally disappear in flush manner when the wedge nose of the block 18 engages on the inside of the clavicle head 5. On the under side, the shaped block 18 is provided with a longitudinal groove 27, whose cross-section corresponds to that of the web 11 on the saddle horn 9.

The processing device 14 further comprises a paring or peeling tool 31. This comprises a pair of peeling knives 32 arranged symmetrically to the path of the saddles 8 and whose cutting edges 33 are oriented counter to the movement direction of the conveyor 7 and parallel to the flanks of the shaped block 18, so as to slide along the latter. At least in the lower region of each peeling knife 32, the cutting edge 33 extends in an arcuate manner, so that the latter starting in the upper region with a vertical configuration increasingly approaches a horizontal configuration in the region of the end 34 directed towards the path of the saddles 8. The peeling knives 32 are so adjusted, that their ends 34 are located directly above the plane of the support faces 10 of the saddles 8. The peeling knives 32 are attached to carrying arms 35, which are pivotably mounted in vertical planes, the pivoting of the paring knives 32 taking place upwards counter to the tension of springs 36. The carrying arms 35 are mounted in the bracket 17, so as to be each rotatable about a vertical axis or spindle 38. The two spindles 38 are synchronized to pivot in opposite directions to each other by synchronizing means 39. In addition, a guide rod 40 engages on one of said spindles 38 and is connected by means of a rocker lever 41 to a roll follower 42, which can be supported under the tension of a spring 44 on a second cam disk 43 of the cam gear 18.

The apparatus functions as follows:

A poultry body 1 freed from its members (extremities) by separating the wings at their body joints 6 and the legs by a cross-cut separating the pelvis with the legs and consequently in the form of a front half is saddled onto a saddle 8 with the sternum 2 upwards and the clavicle 4 directed forwards. The saddle horn 9 penetrates through the neck opening, so that the web 11 comes to rest between the coracoid bones 3 until the sternum 2 engages on the front or end face 13 of the web 11 and on the support face 10 of the saddle 8. Immediately after the clavicle 4 has moved past the separating tool 15, its circular knives 16 penetrate on either side of the crest of the sternum 2 into the breast meat and detach the latter from the flanks of the crest.

When the saddle 8 enters the region of the processing device 14, the shaped block 18 which has just been introduced into the path of the saddle 8 through the tension of spring 25 passes between the branches of the clavicle 4, the web 11 simultaneously entering the groove 27 on the lower face of block 18, while centering the latter with respect to the saddle 8. Block 18 now remains in the swung-in position until the leading wedge nose thereof engages on the head of the clavicle. Then, the branches of the clavicle 4 have also been inserted in the recesses 26 on the flanks of block 18, so that the flanks thereof are flush with the outer contours of the clavicle 4. This process takes place in the same way with a broken clavicle 4, because the latter is situated within the connective tissue and sinews. In the meantime, the peeling knives 32 of the peeling tool 31 located alongside the flanks of the shaped block 18 are moved apart under control of the pivoting of the spindles 38 by means of the cam disk 43, so that the body joints 6, to which is adhering, in articulated manner, the clavicle 4 by its branches, can enter between the peeling knives 32. At the instant at which this takes place, the peeling knives 32 are released for reciprocal approximation, so that they engage initially on the outer flank of the body joints 6. During the advance of the saddle with the shaped block 18, the cutting edges 33 pass on the lower ends 34 of the peeling knives 32, held down by the tension of springs 36, over the contour of the body joints 6 and finally engage with the flanks of the shaped block 18. During this process the sinews connected to the inner fillet of the breast meat have been cut through. Under the tension of the spring 44, the peeling knives 32 now follow the flank contour of the shaped block 18 and thereby release from the breast meat the branches of the clavicle 4 located in the recesses 36 in the flanks of the block 18. On reaching the wedge nose of the block 18, the peeling knives 32 have a reciprocal spacing corresponding to that of the circular knives 16 of the cutting tool 15, so that without further action they are free in the shears or incisions on either side of the crest of the sternum 2. After peeling free the clavicle 4, the shaped block 18 is accelerated in the conveying direction of the saddles 8 by means of the cam disk 24 and is consequently pivoted out of the path of the saddles 8. After the peeling knives 32 have emerged from the incisions alongside the crest of the sternum, they are moved apart in controlled manner, again by means of the cam disk 43, so that a new cycle can take place.

Figure 2:
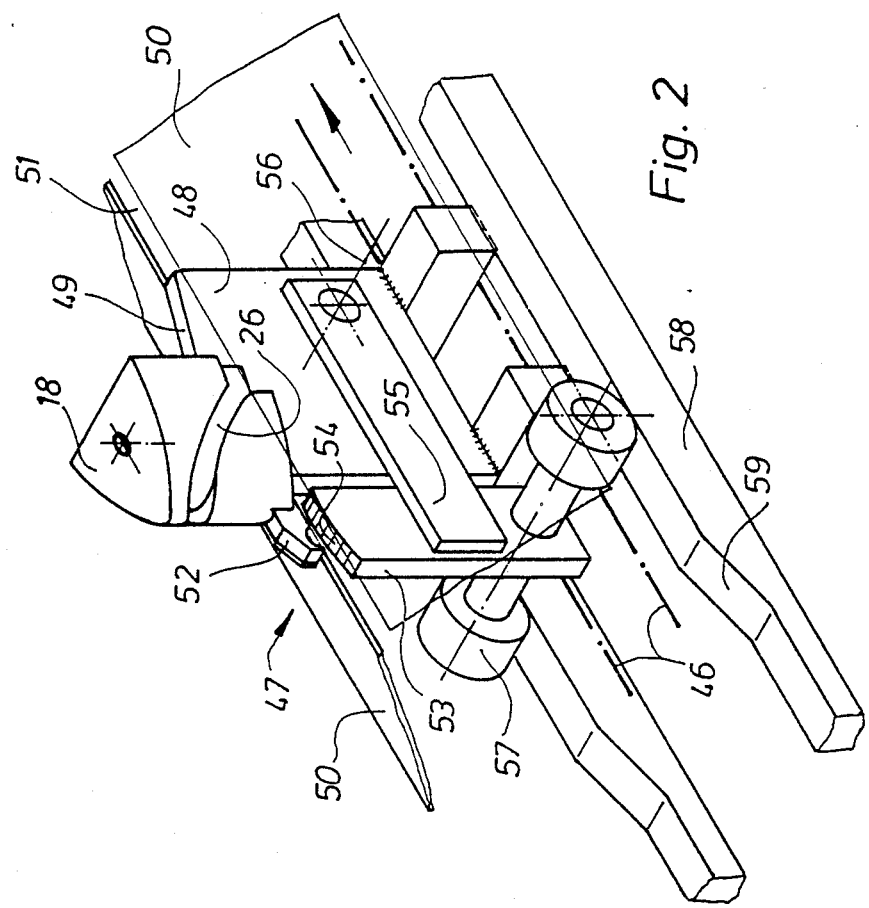
FIG. 2 shows a view of the holding means of an embodiment modified in accordance with the invention in axonometric representation.

An apparatus which is appropriate for processing poultry bodies or rather body parts in the form of breast caps has been represented in FIG. 2. The conveyor 46 is, in this case, equipped with holding means, which are designed as tongs 47 for holding the breast caps of the poultry bodies. They are also mounted at even spacings on the conveyor 46 and comprise one fixed tongs' leg 48 which is guided in an appropriate manner in the non-shown frame. The fixed leg 48 of the tongs is preferably designed as a web extending along the conveying direction and emerging with its head part 49 from between a pair of guide plates 50, which are inclined in a roof-like manner, arranged fixed to the frame and leaving a gap 51 between them. For reasons of better understanding, the front one of the guide plates has been represented so as to appear transparent. The head part 49 ends in a countersupporting nose 52 at its trailing part, the under side of said nose being designed with a rough or non-skidding face and arranged to lie above the guide plates 50. The under side of the countersupport nose 52 opposes a front face 54 of a movable leg 53 of the tongs, which is mounted on the fixed leg 48 of the tongs to be pivotable about a horizontal axis 56 by means of a fork-like holding arm 55. Rollers 57 are connected to the movable leg 53 of the tongs in a manner to be supported on frame-fixed guide rails 58. These guide rails have carriers 59 extending inclined to the conveying plane at suitable positions, so that the rollers 57 passing thereover transmit a vertical movement onto the movable leg 53 of the tongs. A shaped block 18 corresponding to that shown in FIG. 1 is mounted on each head part 49. Its wedge nose is arranged slightly behind the end of the countersupport nose 52.

The function of this apparatus is as follows:

A breast cap to be processed, which has roughly the shape of the poultry body 1 incompletely represented in FIG. 1, is placed with the under side of the sternum 2 on the roof-shaped guide plates 50, and is pushed, with the clavicle 4 leading, against a pair of tongs 47, which have been opened and are conveyed by the conveyor 46. Thereby, the countersupport nose 52 first penetrates into the recess between the coracoid bones 3, and immediately thereafter the shaped block 18 enters into the bifurcation of the clavicle 4. The countersupport nose 52 finally arrives at the end of the sternum 2, which is present between the connecting points of the coracoid bones 3 on the sternum, the under side of the countersupport nose 52 being shoved onto the bone plate present there while displacing the meat parts lying thereon. Simultaneously the branches of the clavicle 4 have entered into the recesses 26 of the shaped block 18. In the meantime, the rollers 57 of the movable leg 53 of the tongs have arrived in the rising area 59 of the guide rails 58, so that the tongs 47 may close and securely hold the breast cap to be treated. Now, a mechanical or also a manual processing may be performed in the described manner, after which process the tongs 47 are opened by means of correspondingly designed areas of the guide rails 58.

The above-described apparatuses can also be modified in such a way that a so-called butterfly fillet is obtained as the end product. The characteristic of this product is that the meat parts on either side of the sternum 2 remain connected. For this purpose, on reaching their closest position, i.e. after passing the clavicle head 5, the peeling knives 32 are moved upwards out of the path of saddles 8, which can take place by means of a further cam disk provided in the cam gear 19. Scraping means are then provided in the filleting part of the machine, which remove the meat from the bone structure starting from the incisions produced by the peeling knives 32.

What is claimed is:

1. A process for gaining meat from at least parts of the bodies of slaughtered poultry, which parts are formed by a poultry skeleton including a clavicle (clavicula) having two branches, coracoid bones, a breast bone (sternum), and body joints of poultry wings, which have been removed, wherein, for detaching the meat from said clavicle, said clavicle is first of all positively fixed by partly embracing at least parts of the branches of said clavicle from the inside thereof, and the meat is subsequently completely separated from the sleleton by a peeling operation along the outer countour of said clavicle, 2. An apparatus for detaching meat from at least part of the bodies of slaughtered poultry, which parts are formed by a poultry skeleton including a clavicle (clavicula) having two branches, coracoid bones, a breast bone (sternum), and body joints of poultry wings, which have been removed, said apparatus comprising a driven conveyor having means for holding and conveying in a conveying direction said poultry bodies freed from their extremities and for supporting said bodies from within the body cavity inside of said breast bone (sternum) with said clavicle oriented first along a path extending in said conveying direction; a shaped block disposed centrally above said path being wedge-shaped in plan view and defining flanks; means for moving said block in a controlled manner into said path and along said path, said flanks of said block describing a contour substantially corresponding to the inner contour of said clavicle and provided with groove-like recesses for the externally flush reception of said branches of said clavicle; a stationary peeling tool arranged above said path of said holding and conveying means, said peeling tool having a pair of reciprocally spring-charged peeling knives having cutting edges; and means for guiding said knives with said cutting edges on said flanks of said shaped block in a height-yieldable manner and for guiding said knives out of said path.

3. An apparatus as claimed in claim 2, wherein said holding means comprises a clamping device for holding breast caps formed from said poultry bodies, said clamping device including an inner and an outer clamping element, each, and said breast caps being held in said clamping device in one of a positive and non-positive manner by said sternum in the region between said connection points of said coracoid bones, wherein said outer clamping element is said shaped block.

* * * * *